A. WRIGHT.

SAFETY PIN.

APPLICATION FILED MAR. 23, 1912.

Reissued May 7, 1912.

13,415.

Witnesses:
J. Frendenwall
L. Broderick

Inventor
Arthur Wright

UNITED STATES PATENT OFFICE.

ARTHUR WRIGHT, OF NEW YORK, N. Y.

SAFETY-PIN.

13,415. Specification of Reissued Letters Patent. Reissued May 7, 1912

Original No. 1,019,578, dated March 5, 1912, Serial No. 536,710. Application for reissue filed March 23 1912. Serial No. 685,903.

*To all whom it may concern:*

Be it known that I, ARTHUR WRIGHT, a citizen of the United States, residing at New York, in the county of New York and State of New York, have invented certain new and useful Improvements in Safety-Pins; and I do declare the following to be a full, clear, and exact description of the invention, such as will enable others skilled in the art to which it appertains to make and use the same.

My invention relates to an improvement in safety pins.

The object of my invention is to provide a safety pin, which is so constructed that it may be readily opened from the top, thus avoiding the necessity of manipulating the lower prong of the pin containing the point, as is necessary with safety pins now in use.

A further object of my invention is to provide a safety pin of the above character, which is of the utmost simplicity of construction, and the cost of manufacture of which is correspondingly low.

Figure 1:
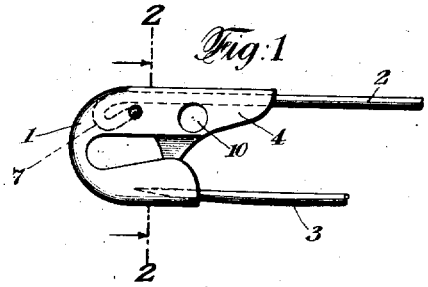
Figure 2:
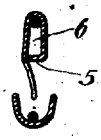
Figure 3:
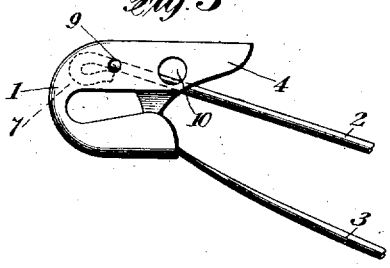
Figure 4:
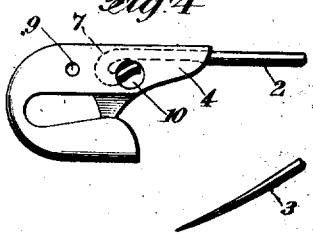
Figure 5:
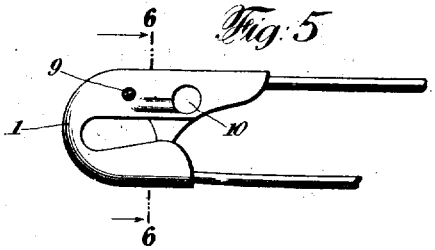
Figure 6:
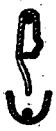

I have shown my invention in the accompanying drawings, in which,

Figure 1 is a side elevation of the head of a safety pin made in accordance with my invention; Fig. 2 is a cross-section of the same taken on line 2—2 of Fig. 1; Fig. 3 is a side elevation of the same showing the head in the position in which it is moved to open the pin; Fig. 4 is a similar view showing the pin opened; Fig. 5 is a view similar to that shown in Fig. 1, but setting forth a slightly modified form; Fig. 6 is a cross-section of the same taken on line 6—6 of Fig. 5; and Fig. 7 is a plan view of the upper prong of the pin.

Figure 7:
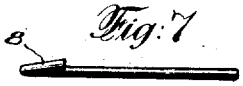

In the drawings, reference being had particularly to Figs. 1 to 4 and 7, 1 is the head of a safety pin adapted to receive an upper prong 2 and a lower prong 3. The head 1 is constructed in the same manner as the usual type of safety pin, except the upper portion thereof. The upper portion is provided with a rearward extension 4, which constitutes a lever arm, and one side thereof is bent into a horizontal plane at 5 to form a chamber 6. The chamber 6 is of just sufficient height to receive the broadest portion of the end of the upper prong 2, which is bent upon itself at 7 to form a rearwardly directed spring-arm 8, the end of which is contiguous to the body of the upper prong 2. The end of the arm 8 is also finished so that it lies in a plane at right angles to the main body of the upper prong 2, as shown in Fig. 7. It will also be noted from Fig. 7, that the end of the arm 8 is also bent to one side of the main body of the upper prong 2, the purpose of which is to cause the end of said arm to engage with a shoulder or abutment at one side of a small hole or opening 9 in a closed position of the pin, and with a shoulder or abutment at one side of a larger opening 10 in the open or release position of the pin. (See Figs. 1 and 4).

In the operation of the pin, assuming the same to have been opened and the end of the upper prong 2 to be in the position as indicated in Fig. 1, the pin is caused to engage a body of fabric in the usual manner, and it is also closed in the usual manner by raising the pointed end of the lower prong 3 over the lower portion of the head 1 of the pin. While in this position no amount of pull exerted by the fabric itself can open the pin, inasmuch as the end of the arm 8 projects into and engages one side of the opening 9. When now it is desired to open the pin, it is merely necessary to pull upwardly upon the lever arm 4, which moves the head of the pin into the position shown in Fig. 3. A further pulling upon the lever arm 4 will cause the end of the upper prong 2 to be moved along the chamber 6 until the arm 8 engages with the opening 10, in which position the lower prong 3 will be released, as shown in Fig. 4. The pin can now be removed from the fabric in the usual manner. Before causing the pin to again engage a fabric, it should be reset by moving the end of the upper prong 2 along the chamber 6 until the arm 8 engages with the opening 9, whereupon the pin can be caused to engage a fabric in the usual manner, and may be closed in the manner already described. It should be noted that when the lower prong 3 has been released, as shown in Fig. 4, the end of the upper prong 2 cannot in any manner be withdrawn from the chamber 6, inasmuch as in any position of the upper prong 2, the end of the arm 8 is caused to engage with some portion of the large opening 10. The pin as already described may thus be readily opened by a slight pivotal movement of the head upon the extreme end of the upper prong 2, and may be easily closed in the usual manner without any interference whatever, by raising the point of the lower prong 3 into the lower portion of the head 1. At the same time, the pin is of the utmost simplicity, inasmuch as it differs from the usual pin now found on the market merely by bending the end of the upper prong 2 somewhat farther until a loop with a twisted end is formed; by punching two holes in one side of the head of the pin and by bending the lower edge of the same side into a horizontal plane to form a closed chamber.

The modification shown in Figs. 5 and 6 is constructed in exactly the same manner as that already described, except that a curved depression 11 is formed leading downwardly from the small opening 9 and then longitudinally to connect with the large opening 10, so that by this means the pin may be opened with greater ease.

Many changes might be made in the details of my construction without departing from the principles of the invention.

I claim:

1. In a safety pin, a rigid head having an abutment, a plurality of prongs engaging the head, one of which is sharpened and the other of which engages with the abutment in the head in the closed position of the pin, the abutment and the prong engaging therewith being so constructed as to effect the release of the sharpened prong by merely moving the head away from the prong which engages the abutment in the head.

2. In a safety pin, a head having an abutment at its side and a pair of prongs, one of which is bent to form a loop, said loop being bent laterally out of the plane of the head to engage with said abutment.

ARTHUR WRIGHT.

Witnesses:
LISETTE BRODERICK,
J. FREUDENVOLL,